March 13, 1973 — W. F. HARRINGTON — 3,719,999
DRAFTING TOOL
Filed Jan. 20, 1971 — 3 Sheets-Sheet 1
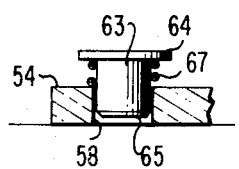
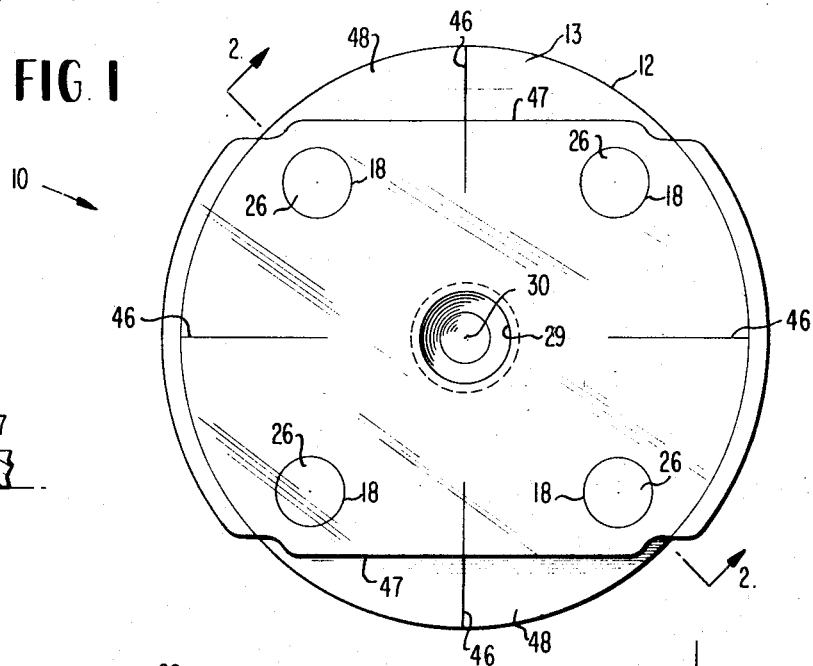
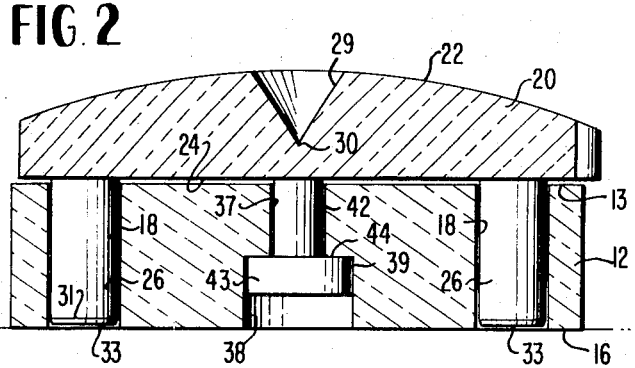
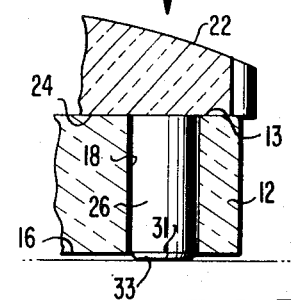
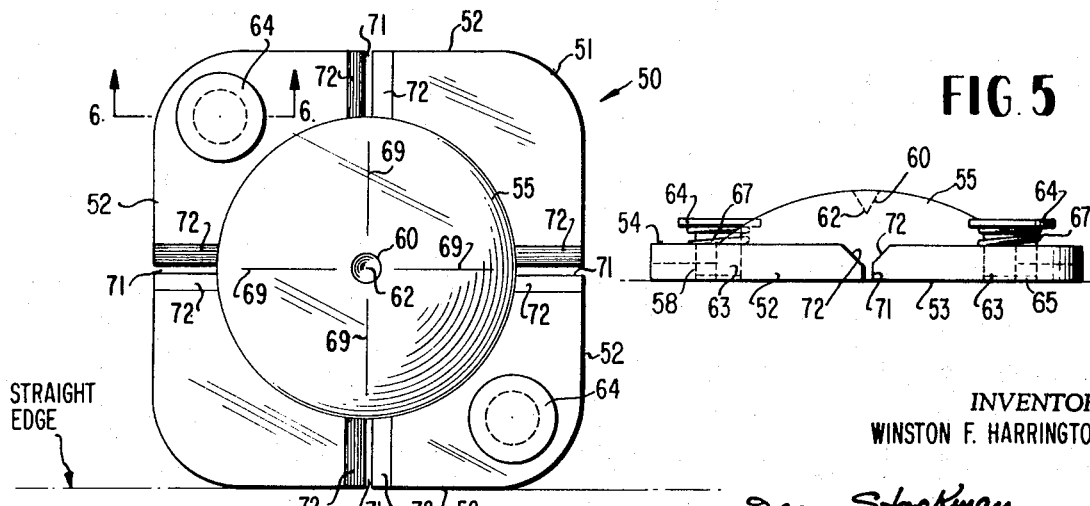
INVENTOR
WINSTON F. HARRINGTON
BY Isons, Stockman, Sears & Santorelli
ATTORNEYS March 13, 1973 W. F. HARRINGTON 3,719,999
DRAFTING TOOL
Filed Jan. 20, 1971
3 Sheets-Sheet 2

INVENTOR
WINSTON F. HARRINGTON

BY
ATTORNEYS.

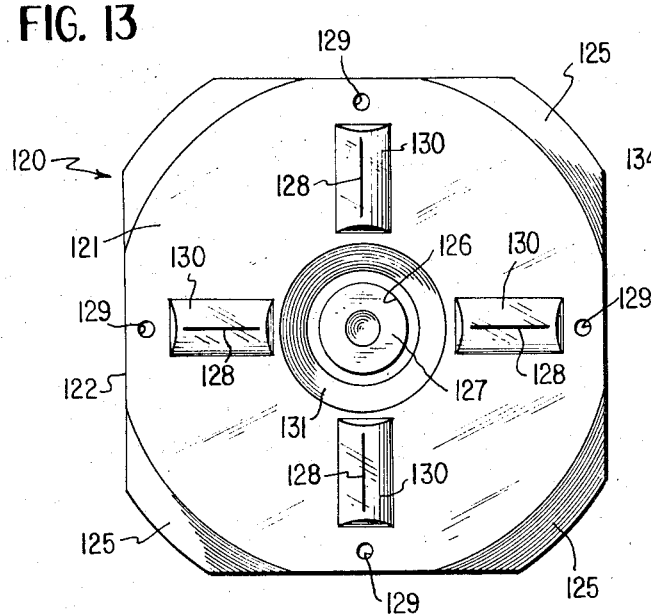
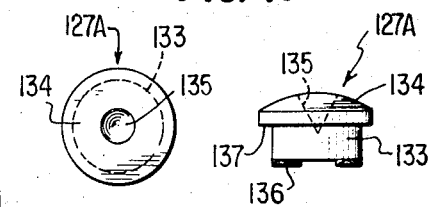
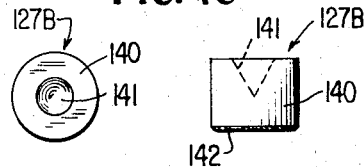
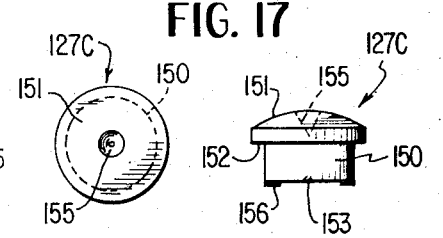
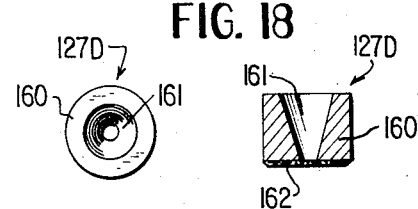
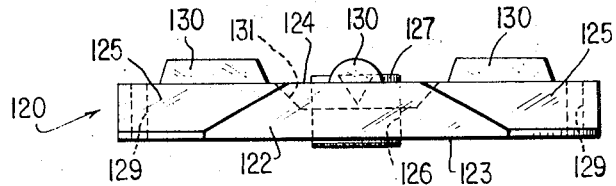
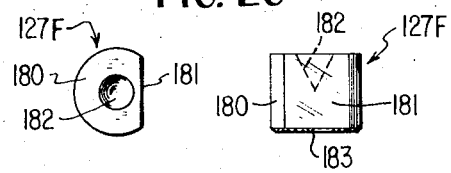
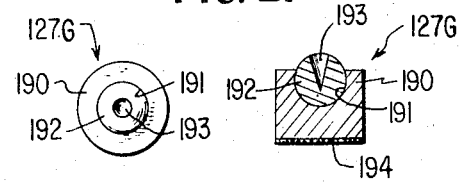
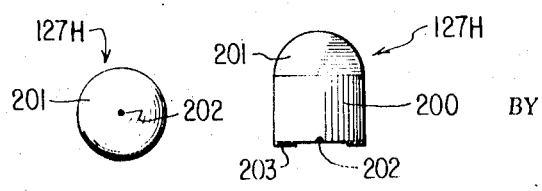
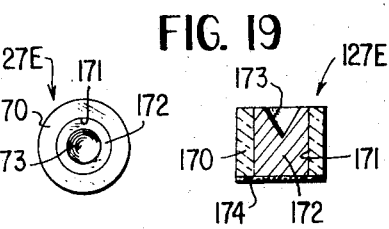

United States Patent Office 3,719,999
Patented Mar. 13, 1973

3,719,999
DRAFTING TOOL
Winston F. Harrington, 9808 Amanita Ave.,
Tujunga, Calif. 91042
Continuation-in-part of application Ser. No. 2,835, Jan. 14, 1970. This application Jan. 20, 1971, Ser. No. 107,889
Int. Cl. B431 7/00
U.S. Cl. 33—27 B    5 Claims

ABSTRACT OF THE DISCLOSURE

A drafting tool comprising a substantially transparent body member adapted to engage a drafting surface and having a recess thereon for engaging the point of a drafting instrument, cross hairs for locating center points and magnifying means for magnifying an area under the body member. The tool may be temporarily held in place by an adhesive material or, alternatively, vacuum-forming means on the bottom thereof. One embodiment incorporates a removable center plug to permit different types of center plugs to be used.

CROSS REFERENCE TO RELATED APPLICATIONS

This application is a continuation-in-part of my copending application Ser. No. 2,835, filed Jan. 14, 1970, entitled "Drafting Tool."

BACKGROUND OF THE INVENTION

This invention relates to drafting tools and, more particularly, to tools used in combination with drafting instruments such as compasses whereby the drawing of circles is greatly facilitated.

When drawing circles and the like on drafting paper or linen surfaces, the draftsman usually inserts the point of the compass directly into the surface. In some cases, however, it is desired not to have any center holes on the drafting paper. In such cases some means must be employed to prohibit the point of the compass from piercing the drafting paper. A further problem arises in those types of drawings where it becomes necessary to draw many circles having the same center. Constant use of the same center point for the drawing of many circles will form a hole in the drafting surface, whether it is paper or linen or any other material, and repeated use will gradually make the hole larger. Additionally, the drawing board or table can be damaged. This problem has been met, to some extent, by the provision in some drafting sets of a thumb tack device which is inserted at the center of the concentric circles. The top of such a device generally has a small recess in the center thereof so that a compass point can be received therein. This approach is satisfactory for only limited applications, however, since the thumb tack device still puts a hole in the drafting surface; it is difficult to insert; it is not easy to remove once it is inserted, and it is difficult to move over the drafting surface without fear of tearing it. Additionally, since such devices are made of metal or other opaque material, it is difficult to position them accurately at the center of the desired circles and consequently unnecessary time is spent in positioning these devices.

Further attempts to solve the problem have included the use of tools of the type having a transparent member with a recess for a compass point in its upper surface and having a plurality of friction pads or rings on its lower surface. However, the friction pads or rings do not provide sufficient stability for drawing circles and thus these tools often have an auxiliary point directly under the center hole. While such a point only makes a small hole, it is still undesirable. Moreover, even with such transparent devices, difficulty is often encountered in positioning these devices over a center point.

The drafting device disclosed herein overcomes these disadvantages of the prior art, as explained herein.

SUMMARY OF THE INVENTION

Among the objects of the present invention is to avoid the disadvantages of prior art drafting tools and to provide a drafting tool which may be easily positioned on a drafting surface over a center point and which permits the drawing of several circles without damaging the drafting surface.

According to the present invention there is provided a drafting tool comprised of a substantially transparent body member adapted to engage a drafting surface and having recess means on the top of the body member for engaging the point of a drafting instrument. The body member further includes cross hairs thereon for use in locating the drafting tool over the center point on a drafting surface. Means also may be provided on the bottom surface of the body for engaging the drafting surface to prevent relative movement between the tool and the drafting surface. The means on the bottom may be either an adhesive or a non-skid material or a vacuum-forming means. Magnifying elements also may be provided on top of the drafting tool to magnify the cross hairs and the area underneath to facilitate location of the tool on a drafting surface.

One embodiment of the invention includes a removable center leg plug which has the recess means in its top and an adhesive material at the bottom. A variety of different types of center plugs may be used for different purposes. In another embodiment of the invention holes are provided in the body of the drafting tool for slidably receiving leg members therein having an adhesive material on their bottom surfaces for engaging the drafting surface after the tool has been properly positioned thereon.

BRIEF DESCRIPTION OF THE DRAWINGS

FIG. 1 is a top plan view of one embodiment of the invention;

FIG. 2 is a sectional view taken along line 2—2 of FIG. 1;

FIG. 3 is a view of a portion of the invention showing the device of FIG. 1 in engagement with a drafting surface;

FIG. 4 is a top plan view of another embodiment of the invention;

FIG. 5 is a side view of the embodiment of the invention illustrated in FIG. 4;

FIG. 6 is a partial sectional view taken along line 6—6 of FIG. 4;

FIG. 13 is a top plan view of a further embodiment of the invention;

FIG. 14 is a side view of the embodiment of the invention shown in FIG. 13, and

FIGS. 15–22 illustrate top and side views of various types of center plugs which may be used with the embodiment of the invention shown in FIGS. 13 and 14.

DESCRIPTION OF A PREFERRED EMBODIMENT

Figure 7:
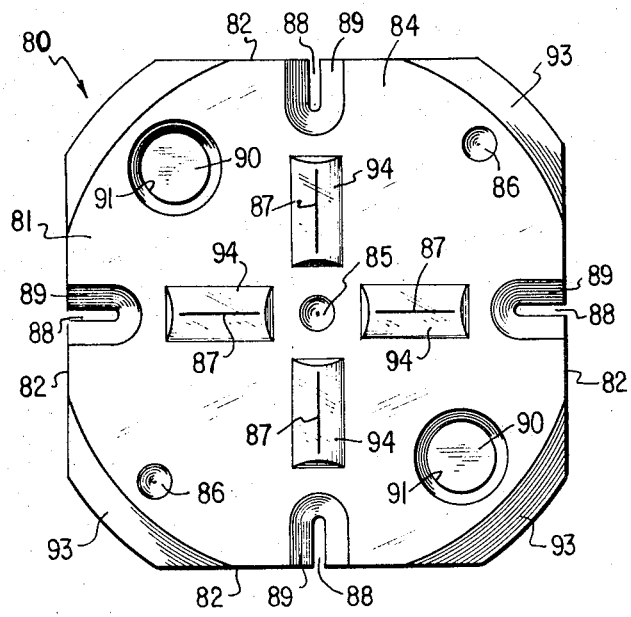
FIG. 7 is a top plan view of another embodiment of the invention.

The preferred embodiments of the invention can best be described with reference to the drawings. FIG. 1 shows one embodiment of a drafting tool 10 that comprises a relatively flat, preferably cylindrical transparent base 12 having flat top and bottom surfaces 13 and 16. The base, which can be made out of any suitable transparent plastic material, defines a plurality of regularly-spaced openings 18 that are arranged in spaced circumferential relation to each other and interconnect the aforementioned top and bottom surfaces 13 and 16.

A transparent body 20 which is mounted on base 12 has an upper surface 22 that is preferably rounded to a suitable spherical configuration so that it functions as a magnifying glass or element and has a flat lower surface 24.

A plurality of legs 26 depend from the body in spaced circumferential relation to each other so that they are aligned with the aforementioned openings 18 in the base. The cross sectional dimension of the legs 26 is slightly smaller than that of the openings 18, so that when the legs are inserted into the openings the body can move vertically relative to the base without the legs binding. In addition, it should be noted that the legs are slightly longer than the base is thick for a purpose which will be described hereinafter. While the leg members and their corresponding openings can be of any suitable configuration, it is preferred that they be cylindrical.

The bottom surface 31 of each leg is coated with a layer of suitable non-skid or adhesive material 33 such as rubber or certain plastics which can releasably adhere to a drawing surface.

A retaining unit is provided to limit relative vertical movement between the base and body member. It may take the form of mutually interlocking ledges defined by a projection depending from the body member that is received in a corresponding opening in the base member.

The portion of the retaining unit in the base comprises an opening having a first section 37 of a relatively small cross section adjacent top surface 13 and a second section 38 of relatively large cross section adjacent to bottom surface 16. The juncture of these two sections defines a downwardly facing ledge 39.

The cooperating element on the body includes a downwardly depending retaining leg having a relatively elongated first section 42 of relatively small cross section adapted to be slidingly received within opening 37 and having a second section 43 of enlarged cross section adapted to be slidingly received in opening 38. The juncture of the first and second sections defines an upwardly facing ledge 44. The relative movement of the base and the body away from each other is thus limited by the engagement of ledge 39 and ledge 44.

A conical recess 29 having an apex 30 is provided at the center of upper surface 22. The recess is deep enough to securely engage the point of a drafting instrument such as a compass.

A set of mutually perpendicular cross hairs 46 are etched in the bottom surface 16 of the base member. Alternatively the cross hairs may be on top of the base member or incorporated within the body thereof. The cross hairs are so arranged that their intersection lies directly below the apex 30.

In order to facilitate the handling of the device on a drawing table, the body 20 can be constructed with parallel sides 47 so that portions 48 of the base are exposed. In this manner the base can be gripped without bringing the non-skid material into contact with the drafting surface.

In order to use the device for the drawing of circles about center lines, the draftsman merely slides the device along the drafting surface on the relatively smooth bottom surface 16 of the base. The mutually perpendicular cross hairs 46 are aligned with the center lines on the drawing paper to locate the apex 30 of the conical recess over the center of the circle. After this is done, the body member is pressed toward the surface so that the legs 26 project through the base and the non-skid material 33 adheres to the paper, thus holding the drafting device in fixed position (FIG. 3). Now, with the center of the hole located, as many circles as are necessary can be drawn with the center of each circle being accurately located by virtue of the conical recess. The dangers of tearing the surface, the compass slipping and holes in the drawing board are avoided.

Referring now to FIG. 4, another embodiment 50 of the drafting tool comprises a generally rectangular transparent body member 51 having straight, mutually perpendicular sides 52. The body member has a flat, smooth bottom surface 53, while the top surface 54 is flat along its outer edges with a centrally positioned, rounded projection 55 which functions as a magnifying element. A conical recess 60 with an apex 62, located at the midpoint of the projection, is adapted to securely receive the point of a drafting instrument.

Figure 8:
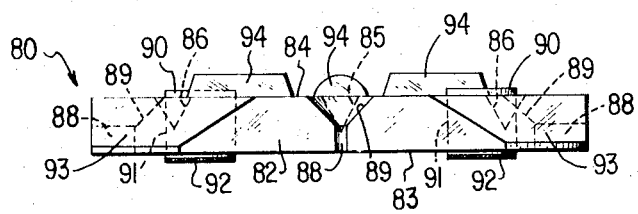
FIG. 8 is a side view of the embodiment of the invention shown in FIG. 7.

The tool may be held against movement on the drafting surface by a plurality of elongated legs 63 that are received in corresponding openings 58 in the flat portion of the base member. Each leg is of slightly smaller cross section than the opening in which it is received to permit relative sliding movement therebetween and has a cap 64 at its top that bears against a suitable spring 67 that is supported on the top surface 54 of the base member. This causes the legs 63 to be normally biased upward away from the drafting surface. The bottom of each leg is coated with a layer of suitable non-skid or adhesive material 65 such as rubber, or certain plastics which can releasably adhere to a drawing surface. Alternatively each leg 63 may be in the form of a cylindrical peg without any cap or spring attached as shown in the embodiment of FIGS. 7 and 8, whereby the body member may be removed, leaving the legs in position for reuse. This, of course, also permits the legs to be replaced much easier.

While openings 58 and legs 63 can be arranged in regular spaced intervals around the edge of the base, a preferred arrangement is to have an opening and leg in each of two opposite corners.

A set of mutually perpendicular cross hairs 69 are etched on the bottom surface of the base and mutually perpendicular slots 71 are cut into the flat portion 54 of the base in alignment with the cross hairs. Alternatively, holes may be used instead of slots as shown in the embodiment of FIGS. 13 and 14. The apex 62 of the conical recess 60 lies over the intersection of these cross hairs. In addition, to facilitate the insertion of a pencil point into the slots, the upper edges thereof are chamfered at 72.

In ordinary use, this embodiment of drafting tool is moved over the drafting surface with the bottom surface thereof in sliding engagement with the surface. The legs, with their non-skid coated bottom 65, are biased by the springs so that they are normally urged away from the drafting surface. When the center of a circle is located, as for example by aligning the mutually perpendicular cross hairs 69 with center lines drawn on the drafting surface, the legs are pushed downwardly and locked in position so that the non-skid material thereon engages the drafting surface, thereby holding the tool in place. A point of a drafting instrument can then be inserted into the conical recess 60 and the desired number of holes can be drawn. If the rounded projection 55 is spherical then it functions as a magnifier, thus permitting more accurate positioning of the tool. In addition, due to the fact that the sides of the member are mutually perpendicular, this embodiment of the tool can be used in conjunction with drafting tools such as T-squares or triangles.

Furthermore, the tool enables locating the center lines for an arc which must be drawn between two points to be located. In this regard, the center of the arc is first located. Then the intersection of the etched cross hairs 69 is positioned over the center and a line is drawn in each of the four slots 71. These lines can be completed at a later time with the usual drafting instruments.

A further embodiment 80 of the drafting tool of the present invention is shown in FIGS. 7 and 8 which comprises a generally rectangular transparent body member 81, having straight sides 82, a generally flat smooth bottom surface 83 and a top surface 84. The corners of body member 81 may be chamfered at their outside edges 93. A conical recess 85 located at the center of the body member 81 is adapted to receive the point of a drafting instrument. Additional conical recesses 86 may be provided on the top surface 84 of the drafting tool to receive the point of a drafting instrument.

A set of mutually perpendicular cross hairs 87 are provided on the body member 81 such that the apex of the conical recess 85 is at the intersection of these cross hairs. Slots 88 extend inwardly from the outside edge of each side 82 in alignment with each of the cross hairs 87. The upper edges of each slot are chamfered as at 89 to facilitate the insertion of a pencil therein.

Individual magnifying bars 94 are provided on the top surface 84 of the body member and positioned over each of the cross hairs 87 to magnify the cross hairs and the area underneath. This permits the instrument to be more easily placed upon a drafting surface over a center point. As shown in FIG. 7, each of the magnifying bars preferably is semi-cylindrical in configuration.

The tool 80 may be held against movement on the drafting surface by a plurality of elongated legs 90, slidably received in corresponding openings 91 in body member 81. The bottom of each leg is coated with a layer of suitable non-skid or adhesive material 92 which can releasably adhere to a drafting surface. In a preferred arrangement of the dafting tool 80, two legs 90 are provided, with each leg being in an opposite corner from the other leg, as shown in FIG. 7. It is to be noted that each of the legs 90 may be slid all the way through each of the openings 91, thus permitting the body 81 of the drafting tool to be removed from the drafting surface while still leaving the legs 90 in position for later use either by the same or by another tool. Moreover, the easily removable feature permits the legs 90 to be easily exchanged for new ones, should the adhesive become weak or new legs desired for other reasons.

Figure 9:
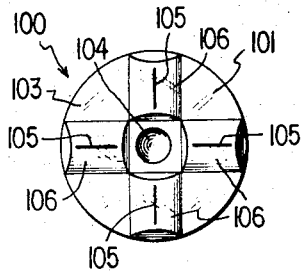
FIG. 9 is a top plan view of a further embodiment of the invention.
Figure 10:
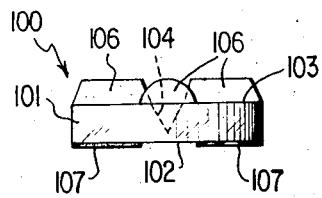
FIG. 10 is a side view of the embodiment of the invention shown in FIG. 9.

Referring now to FIGS. 9 and 10, an additional embodiment of the invention is disclosed wherein the drafting tool 100 is comprised of a transparent body member 101, preferably circular in form, having a flat bottom surface 102 and top surface 103. A conically shaped recess 104 is positioned centrally of the body member 100 at the intersection of at least two mutually perpendicular cross hairs 105 located on the body member. A magnifying bar or element 106 is positioned on each side of the recess over each of the cross hairs 105. The magnifying bars preferably are semi-cylindrical in configuration. This embodiment of the invention is particularly well suited for locating center points wherein it is desired to draw a relatively small circle.

An adhesive or non-skid material 107 is applied to the bottom surface 102 of the body member 101 to releasably adhere the drafting tool 100 to a drafting surface. The adhesive material is generally pie-shaped in configuration in the areas between the magnifying elements 106 to permit an unobstructed view of the cross hairs 105 under the magnifying elements. The adhesive material may be applied in any suitable fashion such as by spraying or the use of a double-sided sticker wherein the side in contact with the bottom surface 102 has greater adhering qualities than the side which contacts the drafting surface.

Figure 11:
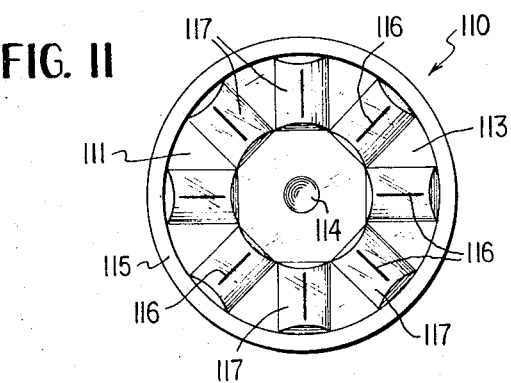
FIG. 11 is a top plan of another embodiment of the invention.
Figure 12:
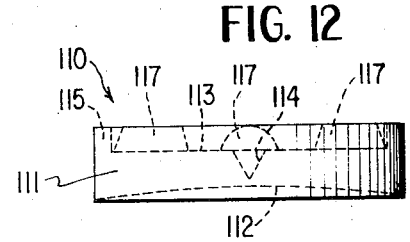
FIG. 12 is a side view of the embodiment of the invention shown in FIG. 11.

An additional embodiment of the present invention is shown in FIGS. 11 and 12 wherein the drafting tool 110 is comprised of a transparent body member 111, preferably circular in form, having a slightly concave bottom surface 112 capable of creating a vacuum when it is firmly pressed against a drafting surface in order to secure the tool thereto. The body member preferably is constructed of a transparent pliable plastic material. The body member is provided on its top surface 113 with a centrally located conically shaped recess 114 for engaging the point of a drafting instrument. A heavy outer rim 115 is provided around the periphery of the body 111 to permit the tool to be securely grasped when applying or removing it from a drafting surface. Moreover, the heavy outer rim 115 provides sufficient rigidity to the body member 111 to permit the forming of a vacuum when the drafting tool is applied to a drafting surface.

A plurality of cross hairs 116 are provided on body member 111 positioned so that they all intersect at the apex of conical recess 114. As shown in FIG. 11, the cross hairs are positioned 45° apart. In addition, semi-cylindrically shaped magnifying bars or elements 117 are positioned over each of the cross hairs to magnify the cross hairs and the area underneath.

Referring now to FIGS. 13 through 22, a further embodiment of the present invention is shown wherein the drafting tool 120 comprises a transparent body member 121, substantially rectangular in configuration, and having stright sides 122. Body member 121 may also be hexagonal in configuration. The body member 121 has a flat, smooth bottom surface 123 and a top surface 124. The corners of the body member 121 may be chamfered at their outside edges 125 as shown in FIG. 13. Positioned centrally of the body member 121 is an opening 126 for slidably and removably receiving a center plug or leg 127 therein. As will be explained hereinafter, this center plug may take various forms. A circular depression 131 is provided around opening 126 to facilitate grasping of the center plug.

At least two mutually perpendicular cross hairs 128 are positioned on body member 121 in such a manner that their intersection lies at the center of opening 126. While the cross hairs preferably are etched on the bottom surface of body member 121, they may also be incorporated either at the top or in the body member. The remaining blank space on the surface of body member 121 may, if desired, be engraved with other markings for other drafting functions.

A plurality of holes 129 are provided through body member 121 in alignment with and at the end of each cross hair 128 adjacent each edge of the body member. A semi-cylindrically shaped magnifying bar or element 130 is positioned on the top surface 124 over each cross hair 128 to magnify the cross hair and the area underneath for assistance in positioning the tool on the drafting surface.

An important feature of the embodiment of the invention shown in FIGS. 13 and 14 is the use of the center opening or hole 126 and the removable and exchangeable center plug or leg 127. As shown in FIGS. 15 through 22, this center plug may take a variety of forms.

The center plug 127A, shown in FIG. 15, is comprised of a transparent cylindrical body portion 133 and a transparent dome-shaped top portion 134, having a conical recess 135 centrally positioned therein for engaging the point of a drafting instrument. If desired, the bottom of the center plug may be provided with an adhesive or non-skid material 136 to releasably secure the plug to a drafting surface. The top 134 of the center plug of FIG.

15 is provided with a shoulder 137 which overlaps and engages with the edges of the opening 126 in the drafting tool 120.

In FIG. 16 the center plug 127B is comprised of a cylindrical body member 140 having a centrally disposed conical recess 141 on the top thereof for receiving the point of a drafting instrument and an adhesive or nonskid material 142 on the bottom for releasably securing the plug to the drafting surface.

The center plug 127C of FIG. 17 is comprised of a transparent cylindrical body member 150 having a larger transparent dome-shaped top member 151. The top member 151 forms an outer shoulder 152 which is adapted to overlap and contact the edges of opening 126 in drafting tool 120. The body member 150 is provided with a point 153 marked on the bottom surface at the center thereof for facilitating the locating of a center point on a drafting surface. In this connection, the dome-shaped top part 151 of the center plug of FIG. 17 functions as a magnifying element to magnify point 153 and the area underneath. If desired, the center plug of FIG. 17 may be provided with a centrally located, small conically shaped recess 155 at the top thereof for engaging the point of a drafting instrument. Additionally, the bottom surface of the center plug may be provided around its outer periphery with adhesive material 156 for releasably securing the instrument to a drafting surface.

Another form of center plug 127D is shown in FIG. 18 which comprises a cylindrically shaped body member 160 having a centrally located conically shaped opening 161 therein which extends all the way through the body member. The bottom surface of body member 160 may be provided with adhesive material 162 to releasably secure the plug to a drafting surface. This form of center plug is particularly adapted for use with a drafting instrument having a ball-shaped tip.

Referring now to FIG. 19, the center plug 127E is comprised of a transparent cylindrically shaped body member 170 having a central opening 171 extending therethrough. A metal insert 172, securely fastened in opening 171, is provided with the centrally located conical recess 173 on its top thereof for receiving the point of a drafting instrument. The metal insert 171 may be made of a hardened steel. The use of the metal insert gives a much longer life expectancy to the center plug since sharp pointed instruments are less likely to wear a hole through the metal material. This type of center plug is also useful in connection with a drafting instrument having a dull or ball-shaped tip. The center plug of FIG. 19 also is provided with an adhesive material 174 on its bottom surface thereof for releasably securing the plug to a drafting surface.

The center plug 127F shown in FIG. 20 has a cylindrically shaped body 180 having a flattened surface 181 on one side thereof. In addition, a centrally located conical recess 182 is provided for receiving the point of a drafting instrument while an adhesive or non-skid material 183 is provided on the bottom surface for releasably securing the plug to a drafting surface. This embodiment of the center plug may be used in pairs as a double center for certain types of ellipse drawing instruments. The flat surfaces 181 are for clearance where a large size ellipse is being drawn with these instruments.

The center plug 127G illustrated in FIG. 21 is comprised of a cylindrical body member 190 having a spherically shaped socket or recess 191 at the top thereof in which is rotatably mounted a ball member 192 having a recess 193 therein for receiving the point of a drafting instrument. Recess 193 is relatively long and narrow so as to fit the point of the drafting instrument like a glove to give greater stability to the drafting instrument. An adhesive or non skid material 194 may be provided on the bottom of the center plug for releasably securing the plug to a drafting surface.

Referring to FIG. 22, the center plug 127H is comprised of a cylindrical body member 200 having a spherically shaped magnifying dome 201 on the top thereof adapted to stick up above the top surface 124 of drafting tool 120. The spherically shaped dome is particularly adapted to engage a drafting instrument such as a compass having a co-operating socket rather than a point. A point 202 may be marked on the bottom surface of the plug at the center thereof for facilitating the locating of a center point on a drafting surface. Adhesive or non-skid material 203 may be applied to the bottom of the center plug.

The advantages of a removable and exchangeable center plug in the embodiment of the drafting tool shown in FIGS. 13 through 22 are believed obvious. The many different types of center plugs which may be used permit a wider variety of uses of the drafting tool, thus a wide variety of functions may be accomplished through the use of one simply constructed drafting tool without the necessity of employing a large number of additional, more complicated instruments. Worn out center plugs may also be easily replaced. In addition, with those center plugs without shoulders, the body of the drafting tool may be removed after properly locating the tool on the drafting surface, thus permitting small circles to be drawn. Moreover, the center opening in the body of the tool is useful as a pilot hole to center the tool on an engraving machine to engrave cross hairs on the body.

It will also be understood that the invention contemplates that certain features shown in any one embodiment may be incorporated into other embodiments shown in the drawings. It is further to be understood that the invention is not limited to the particular embodiments described and shown herein, but includes any modification and equivalents within the scope of the appended claims.

I claim:

1. A drafting tool comprising
   a substantially transparent body member having top and bottom surfaces, said bottom surface being adapted for sliding engagement with a drafting surface,
   a central straight walled opening defined by said body member and extending through from said top to said bottom surface,
   a removable plug member slidingly received in said opening,
   said body member and said plug member being independently removable from each other without disturbing the other from its position on the drafting surface,
   recess means on top of said plug member for engaging the point of a drafting instrument,
   friction material on the bottom of said plug member for engaging a drafting surface,
   at least two mutually perpendicular cross hairs on said body member having a point of intersection at the center of said recess means,
   means on said body member for magnifying said cross hairs, and,
   openings defined by said body member in alignment with said cross hairs to permit marks to be made on said drafting surface in alignment with said cross hairs.

2. A drafting tool as defined in claim 1 wherein said body member includes a depression around said opening.

3. A drafting tool as defined in claim 1 wherein said plug member includes a metal insert having said recess formed therein.

4. A drafting tool as defined in claim 1 wherein said recess extends all the way through said plug member.

5. A drafting tool as defined in claim 1 wherein said plug member includes a socket on the top thereof and a ball movable in said socket, said recess being formed in said ball.

(References on following page)

References Cited

UNITED STATES PATENTS

| | | | |
|---|---|---|---|
| 3,292,262 | 12/1966 | Moll | 33—27 C |
| 1,571,777 | 2/1926 | Golden | 33—27 C |
| 2,989,808 | 6/1961 | Koenig | 33—18 R |
| 2,853,785 | 9/1958 | Raifsnider | 33—137 |
| 2,428,201 | 9/1947 | Cannarili | 408—72 |

FOREIGN PATENTS

| | | | |
|---|---|---|---|
| 399,018 | 7/1924 | Germany | 33—27 C |
| 392,902 | 5/1965 | Switzerland | 33—27 C |

OTHER REFERENCES

Popular Science, February 1956, p. 236.

HARRY N. HAROIAN, Primary Examiner